United States Patent

Kidorf

[11] Patent Number: 6,016,373
[45] Date of Patent: Jan. 18, 2000

[54] APPARATUS AND METHOD FOR CONFIGURING A FIBER OPTICAL ASSEMBLY

[76] Inventor: Howard D. Kidorf, 82 Tower Hill Dr., Red Bank, N.J. 07701

[21] Appl. No.: 08/867,726

[22] Filed: Jun. 3, 1997

[51] Int. Cl.[7] ........................................................ G02B 6/26
[52] U.S. Cl. ................................ 385/24; 385/14; 385/46; 385/99
[58] Field of Search .................................. 385/24, 14, 46, 385/99, 17, 49, 20

[56] References Cited

U.S. PATENT DOCUMENTS

| | | | |
|---|---|---|---|
| 5,508,835 | 4/1996 | Takahashi et al. | 385/14 |
| 5,790,731 | 8/1998 | Deveau | 385/49 |
| 5,799,118 | 8/1998 | Ogusu et al. | 385/14 |
| 5,870,512 | 2/1999 | Koch et al. | 385/14 |
| 5,889,900 | 3/1999 | Hallemeier | 385/11 |

*Primary Examiner*—Hung N. Ngo
*Attorney, Agent, or Firm*—Brian K. Dinicola

[57] ABSTRACT

In a fiber optic assembly that is sealed within an enclosure and that has a plurality of optical transmission paths available to transmit input signals through the assembly, a separate link is provided for each transmission path. Each of the separate links has a first end that is located external to the sealed enclosure and a second end that is located within the enclosure and adjacent to the link's associated transmission path. The link is capable of transmitting energy from an energy source coupled to the link at the first end through the link to the second end. The energy is received at the second end of the link, where the second end's proximity to its associated optical transmission path allows the energy to act on the transmission path to render the path inoperable for transmitting an input signal along the path and through the assembly. As such, the fiber optic assembly is configured to permit selected input signals to be transmitted through the fiber optic assembly to a particular destination based upon the requirements of the communication system into which it is integrated.

20 Claims, 4 Drawing Sheets

APPARATUS AND METHOD FOR CONFIGURING A FIBER OPTICAL ASSEMBLY

BACKGROUND OF THE INVENTION

The present invention relates to an apparatus and method for configuring a fiber optic assembly. More specifically, the invention provides for configuring a fiber optic assembly that is contained in a sealed enclosure to meet the specific requirements of the optical communication system into which the fiber optic assembly is inserted.

A particular fiber optic assembly may need to be sealed in an enclosure that protects the assembly against a particular environment. Additionally, the fiber optic assembly may need to have a particular configuration to meet the requirements of the system into which it is inserted. An example of this type of assembly would be a branching device that is utilized in an undersea communications system. One of the functions of the branching device is to receive particular information carrying signals and direct them to specific destinations. As such, the signal transmission paths within the branching device have a specific configuration to support the communication system's requirements. The requirements of the system into which the assembly is to be inserted must be known in advance so that the assembly can be specifically configured to meet the system's requirements before the assembly is sealed within an enclosure.

This need to have prior awareness of a specific communication system's requirements presents drawbacks when both initially installing a system and when having to replace an inoperative fiber optic assembly. In both circumstances, either a fiber optic assembly must be specifically ordered and configured to meet the system's requirements and then sealed in an enclosure or a fiber optic assembly that has been previously configured and sealed in an enclosure must be found.

It would be desirable to have a fiber optic assembly that is capable of meeting the requirements of numerous systems without having to know the requirements of a system before sealing the assembly in an enclosure. Sealed assemblies could be manufactured and made available to support new installations and repair needs and be configured as needed, when needed, to support any particular system's requirements. In this manner, when a fiber optic assembly is needed, a sealed assembly could be pulled from stock, configured to meet the system's requirements, and installed in the system. As such, fiber optic assemblies could support the requirements of numerous differently configured systems.

The present invention provides for configuring a fiber optic assembly after the assembly is sealed within an enclosure. In this manner, a generic fiber optic assembly that is capable of meeting the requirements of numerous differently configured systems is provided.

SUMMARY OF THE INVENTION

An apparatus and method for configuring a fiber optic assembly is provided. The invention provides for configuring a fiber optic assembly that is already sealed in an enclosure to support a particular communication system's requirements.

In a fiber optic assembly where a plurality of optical transmission paths are available to transmit input signals through the assembly, a link is provided for each transmission path that can be used to render the path inoperable. The link has a first end that is located external to the sealed enclosure and a second end that is located within the enclosure and adjacent to the transmission path. The link is capable of transmitting energy from the first end to the second end from an energy source coupled to the link at the first end. The energy is received at the second end of the link, where the second end's proximity to the transmission path transfers the energy to the transmission path to render the transmission path inoperable. As such, the transmission path is incapable of transmitting an input signal along the path and through the assembly, resulting in that particular input signal not being transmitted through the assembly to a particular destination. In this manner, by selectively rendering particular transmission paths inoperable for transmitting particular input signals through the assembly, a generic fiber optic assembly may be configured to meet the specific requirements of the communications system that it is to be integrated into.

DETAILED DESCRIPTION

Figure 1:
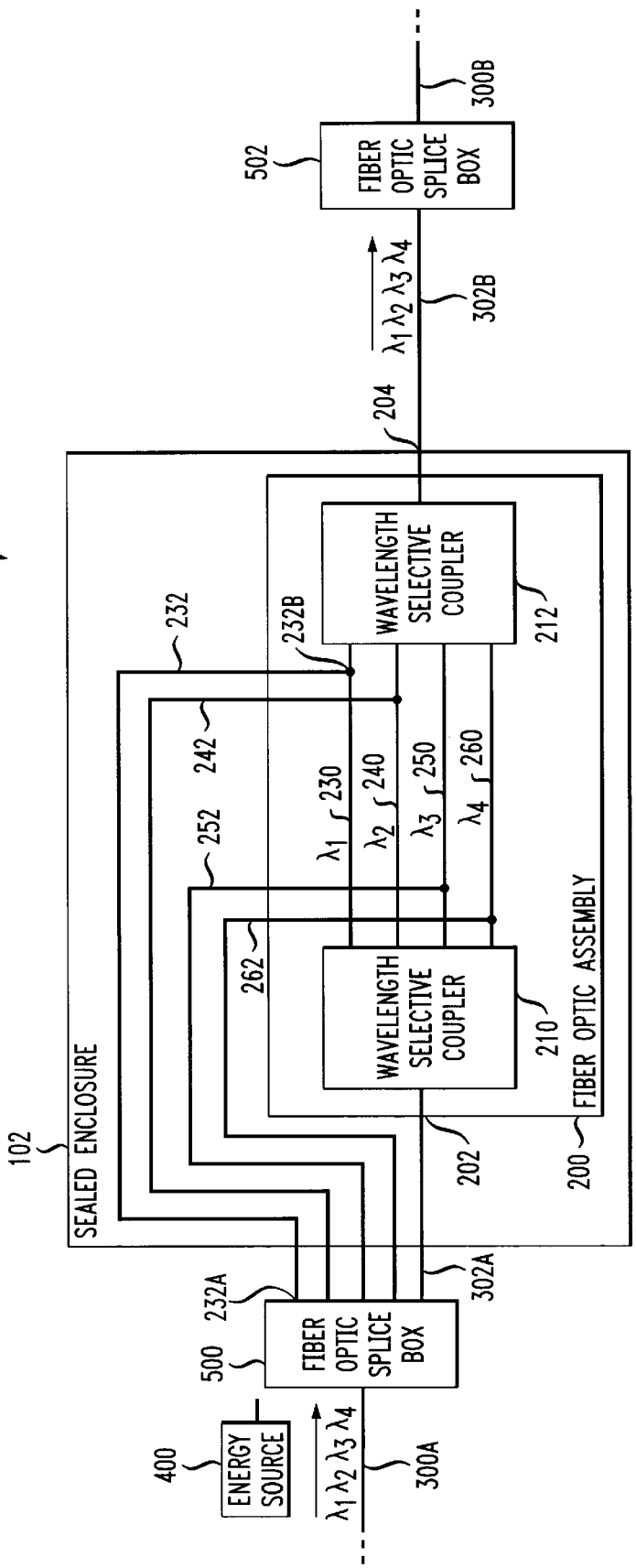
FIG. 1 illustrates one embodiment of a fiber optic assembly that is contained in a sealed enclosure that is able to be configured according to the present invention.

FIG. 1 illustrates one embodiment for practicing the present invention. In FIG. 1, a sealed enclosure 100 contains a fiber optic assembly 200 within it. Sealed enclosure 100 may be, for example, a housing that contains components utilized in an undersea fiber optic communications system. In the undersea communications systems example, fiber optic assembly 200 could be one component in a branching device. Whereas an undersea application is one context in which the present invention may be practiced, the invention is not limited to such an application and the invention has utility in any arrangement where a fiber optic assembly is sealed in an enclosure and the assembly requires configuration after it has been sealed in the enclosure. Therefore, fiber optic assembly 200 could be any fiber optic component or subassembly of a system that has a plurality of optical transmission paths available to transmit input signals through the assembly to other components or sub-assemblies within the enclosure or to a particular destination external to the enclosure.

As seen in FIG. 1, input transmission fiber 300A is a single fiber that carries information signals. In this example the fiber carries four separate signals at wavelengths $\lambda 1$, $\lambda 2$, $\lambda 3$, and $\lambda 4$. Input transmission fiber 300A is coupled to input local fiber 302A by a fusion splice, or other techniques that are well known in the art, that is housed in fiber optic splice box 500. Input local fiber 302A transmits the signals that are coupled onto it from input transmission fiber 300A through sealed enclosure 100 and into fiber optic assembly 200, which is enclosed within enclosure 100. Therefore, through the coupling of input transmission fiber 300A to input local fiber 302A, a transmission path is established into enclosure 100 and fiber optic assembly 200.

Within fiber optic assembly 200, several optical transmission paths exist. Wavelengths λ1, λ2, λ3, and λ4 are carried on local fiber 302A as they are input into fiber optic assembly 200. After entering fiber optic assembly 200, each wavelength is coupled onto a single fiber that only carries that wavelength on that particular fiber. Well-known means in the art may be utilized to couple each wavelength onto its own individual fiber, e.g. by utilizing wavelength-selective coupler 210. Each input wavelength is carried over its single-fiber optical transmission path where it is coupled onto output local fiber 302B by, for example, wavelength-selective coupler 212. As such, fiber optic assembly 200 contains a plurality of optical transmission paths where each transmission path is able to transmit an input signal, i.e. one of wavelengths λ1–λ4, through fiber optic assembly 200 and onto output local fiber 302B and output single transmission fiber 300B for receipt at a particular destination. Output local fiber 302B is coupled to output transmission fiber 300B by utilizing a fusion splice, as discussed above, that is housed in fiber optic splice box 502.

Wavelength λ1 is transmitted through fiber optic assembly 200 on optical transmission path, or fiber 230, wavelength λ2 on fiber 240, wavelength λ3 on fiber 250, and wavelength λ4 on fiber 260. Therefore, if the particular communication system into which is inserted fiber optic assembly 200 requires that all four wavelengths, λ1–λ4, be transmitted through fiber optic assembly 200 to be received at a particular destination, each wavelength will enter the assembly on input local fiber 302A, be coupled onto its own optical transmission path, and then be coupled onto output local fiber 302B and output transmission fiber 300B for receipt at a user location.

However, not all information signals that are input to the fiber optic assembly, namely wavelengths λ1–λ4, may be required or desired to be transmitted to a particular destination. The signals to be transmitted to any particular destination are determined by the requirements of the communication system. Therefore, should the requirements of the system dictate that, for example, only input wavelengths λ2 and λ4 be received at a particular destination, the present invention provides for configuring fiber optic assembly 200 to only transmit these two wavelengths, or any single input wavelength or combination thereof, depending on system requirements, to a particular destination.

As shown in FIG. 1, fiber optic assembly 200 includes links 232, 242, 252, and 262 which are associated with optical transmission paths 230, 240, 250 and 260, respectively. Links 232, 242, 252, and 262 are utilized to transmit energy from an energy source 400, located external to sealed enclosure 100, through the enclosure boundary 102 to optical transmission paths 230, 240, 250 and 260, respectively. The energy transferred to the optical transmission paths by the links breaks the optical transmission path, thereby rendering the optical transmission path inoperable and no longer capable of transmitting an input signal through fiber optic assembly 200 on that optical transmission path. Once the optical transmission path is inoperable, or broken, it cannot be utilized for transmitting a signal through the fiber optic assembly.

Links 232, 242, 252, and 262 are contiguous and extend from a first end, located external to sealed enclosure 100, to a second end located within the sealed enclosure and adjacent to their respective optical transmission path. FIG. 1 illustrates the positioning of first end 232A and second end 232B for link 232. Each of the other links, 242, 252, and 262, is similarly configured.

The first end of each link is housed in fiber optic splice box 500 and is utilized to couple an energy source to that particular link such that the source can transmit energy into the link. In the disclosed embodiment, energy source 400 is a high-powered laser and links 232, 242, 252, and 262 are optical fibers that are able to transmit a high powered optical pulse from the high-powered laser through the link. Energy source 400 is individually coupled to the first end of each link by methods that are well-known in the art. As such, energy source 400 is individually coupled to a particular link when it is desired to render the optical transmission path associated with that particular link incapable of transmitting a signal through the fiber optic assembly.

After energy source 400 is individually coupled to first end 232A of link 232, optical power can be transmitted through link 232 to second end 232B. As previously mentioned, second end 232B is located adjacent to, and in sufficient proximity to, optical transmission path 230 such that the energy received at second end 232B of link 232 is able to act on optical transmission path 230 to break the optical fiber that comprises path 230. Second end 232B is maintained in a position adjacent to optical transmission path 230 by any of a variety of mechanical positioning devices available and well known in the art. Once the fiber 230 is broken, optical transmission path 230 is no longer capable of transmitting a signal along the path. After the selected optical fiber transmission paths are rendered inoperable, or if no configuring of the optical transmission paths is required, the portion of each link that extends external to enclosure 100 may be severed at a position between the first end of the link and the sealed enclosure, if desired.

In this manner, a fiber optic assembly that contains multiple optical transmission paths, where each transmission path carries a separate input signal, may be configured such that selected transmission paths are rendered inoperable such that the input signal that is carried on the now inoperable transmission path is not transmitted through the fiber optic assembly to a user destination.

Figure 2:
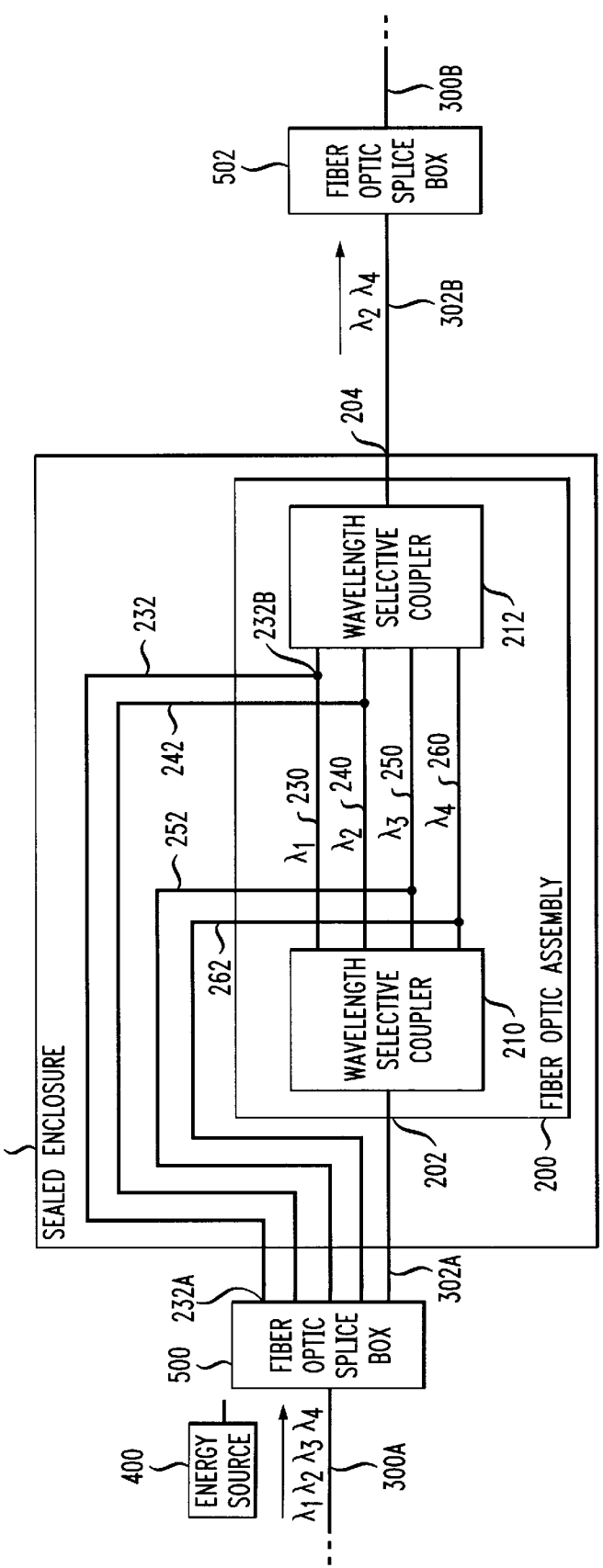
FIG. 2 illustrates the fiber optic assembly of FIG. 1 after being configured to meet a particular communication system's requirements.

FIG. 2 illustrates the fiber optic assembly of FIG. 1 where fiber optic assembly 200 has been configured to permit only optical transmission paths 240 and 260 to transmit input wavelengths λ2 and λ4 through assembly 200. As shown in FIG. 2, optical transmission paths 230 and 250, which are paths for transmitting signals at wavelengths λ1 and λ3, respectively, have been broken such that these transmission paths are no longer able to transmit signals along these paths. As such, it can be seen that by configuring fiber optic assembly 200 through the use of the present invention, of the four signals at wavelengths λ1, λ2, λ3, and λ4 that are input to fiber optic assembly 200, only signals at wavelengths λ2 and λ4 are transmitted out of fiber optic assembly 200 to be directed to a particular destination.

As stated previously, the second end of each link is the location where the energy in the link is transferred to the optical transmission path such that the energy can act on the transmission path. It has been disclosed that the second end is located adjacent to the optical transmission path. As such, it is only required that the relative positioning of the second end of the link to the optical transmission path allows for transmission of sufficient energy from the link to the optical transmission path to render the optical transmission path incapable of transmitting a signal along the transmission path. Alternatively, the second end of the link could be positioned such that it is in direct contact with the optical transmission path.

The second end of each link that is utilized in a particular application should be positioned only adjacent to one optical transmission path. In this manner, the energy transmitted through the link will only be transferred to one optical transmission path and thus, only one optical transmission path will be rendered inoperable. However, if it is known that multiple paths will be required to be rendered inoperable in combination, then one link may be positioned adjacent to this combination of links such that the energy transmitted in the link and transferred to the combination of optical transmission paths is sufficient to render the combination of paths inoperable.

In order to increase the amount of energy that is transferred between the second end of a link and the link's associated optical transmission path, thus facilitating the process of rendering the optical transmission path inoperable, modifications can be made to the link's second end and/or the optical transmission path. For example, a focusing apparatus can be placed on the second end of the link to focus the optical energy that is transmitted from the link to the optical transmission path. A modification that could be made to the optical transmission path in order to increase its energy absorption capacity is to coat the fiber that constitutes the path with an absorptive optical coating. These two specific modifications are illustrative and it is contemplated that additional alternatives are possible to achieve the desired result.

Figure 3:
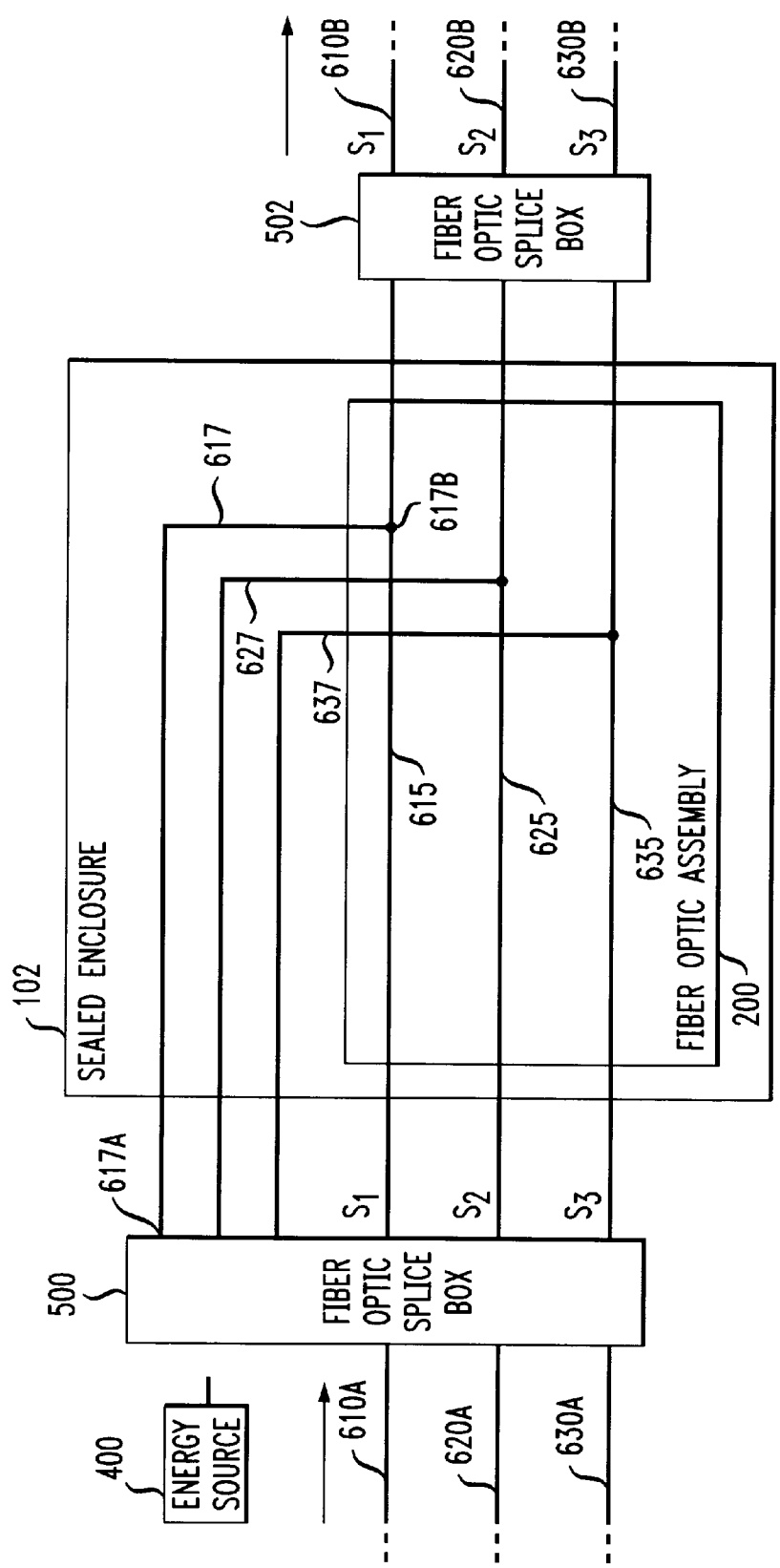
FIG. 3 illustrates a second embodiment of a fiber optic assembly that is contained in a sealed enclosure that is able to be configured according to the present invention.
Figure 4:
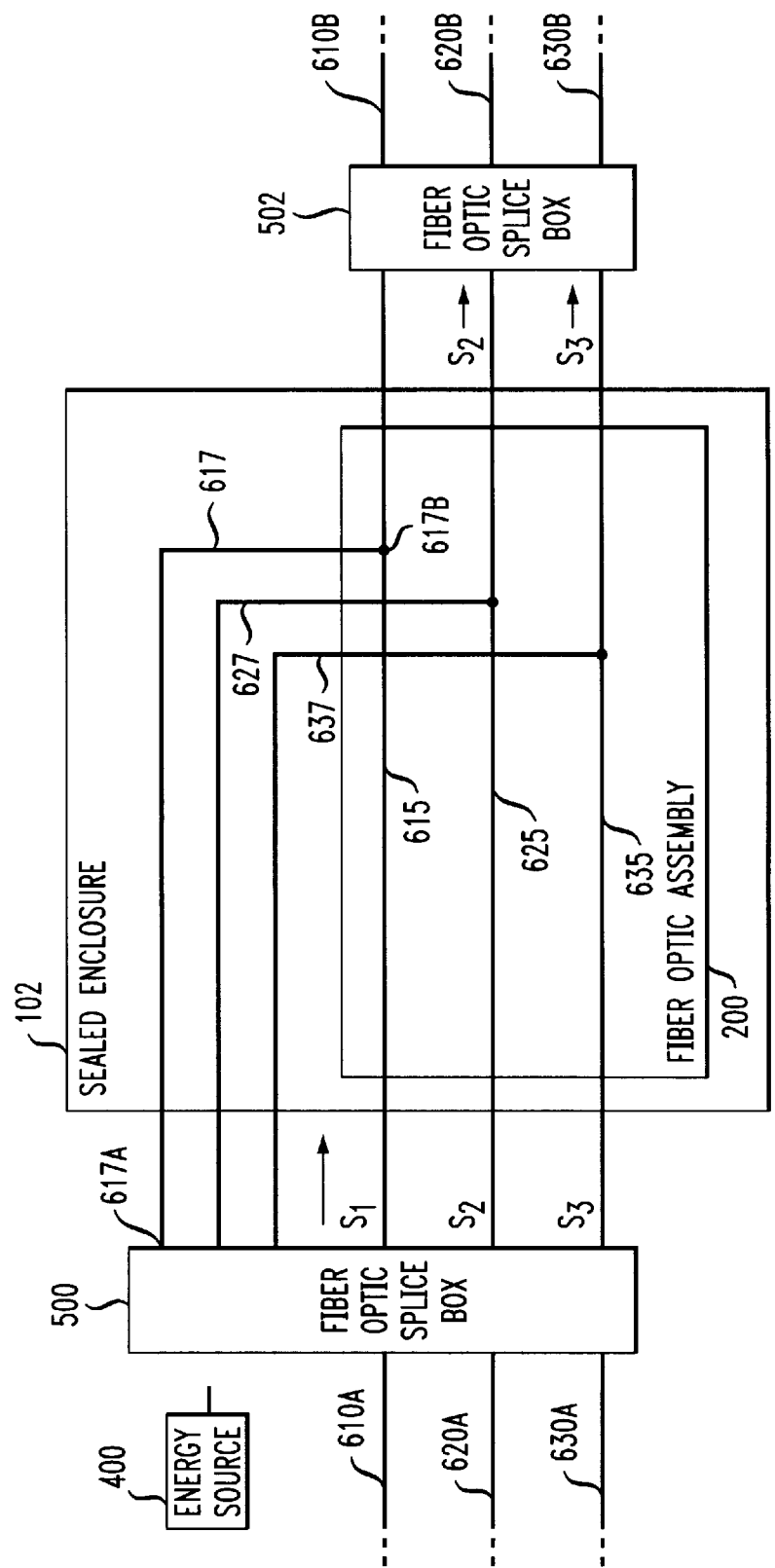
FIG. 4 illustrates the fiber optic assembly of FIG. 3 after being configured to meet a particular communication system's requirements.

FIGS. 3 and 4 illustrate the present invention as utilized in a communications system where signals are input to, and are output from, the fiber optic-assembly on their own dedicated transmission fiber rather than being multiplexed on one single transmission fiber.

As can be seen in FIG. 3, input transmission fibers 610A, 620A, and 630A carry optical signals S1, S2, and S3, respectively. Signals S1, S2, and S3 enter enclosure 100 and fiber optic assembly 200 by being coupled onto local fibers 615, 625, and 635 by fusion splicing input transmission fibers 610A, 620A, and 630A to local fibers 615, 625, and 635, respectively. Fiber optic splice box 500 houses the fusion splices utilized to couple input transmission fibers 610A, 620A, and 630A to local fibers 615, 625, and 635. Local fibers 615, 625, and 635 are optical transmission paths which are capable of transmitting incoming signals through fiber optic assembly 200.

In order to configure fiber optic assembly 200 to only allow, for example, signals S2 and S3 to be transmitted through the assembly for receipt at a particular destination, the present invention is utilized in the same manner as described previously for the embodiment of FIGS. 1 and 2. As such, energy source 400 is coupled to link 617 at first end 617A within fiber optic splice box 500. Energy from the energy source is transmitted from a location external to the sealed enclosure to within the sealed enclosure by link 617. The energy is transferred from second end 617B of link 617 to optical transmission path 615. Second end 617B is located in proximity to optical transmission path 615 such that sufficient energy can be transferred to the optical transmission path to render the transmission path inoperable of transmitting an optical signal along the path. As such, optical transmission path 615 is no longer capable of transmitting signal S1 through fiber optic assembly 200 and therefore, as shown in FIG. 4, only signals S2 and S3 are transmitted through fiber optic assembly 200 and coupled to output transmission fibers 620B and 630B for transmission to a particular location. Local fibers 615, 625, and 635 are coupled to output transmission fibers 610B, 620B, and 630B, respectively, by fusion splices housed in fiber optic splice box 502.

Several variations on the disclosed embodiments are contemplated. In the disclosed embodiments, the links are contiguous and extend through the sealed enclosure. However, the links are not required to be contiguous. For example, the portion of each link that is located outside of the sealed enclosure could be a separate element. In use, if a fiber optic assembly required a particular configuration, the separate outside link portion that couples the energy source to the link and that transmits the energy into the sealed enclosure could be mated with a separate portion of the link that is enclosed within the sealed enclosure and which would transmit the energy to the second end of the link. The portion of the link located external to the enclosure and the portion of the link located internal to the enclosure could be joined at the enclosure boundary by a connection device, such as a fiber optic connector. In this manner, each link is not required to be contiguous.

In the disclosed embodiment, the links are optical fibers. However, the links could be composed of any suitable material, or combination of materials, that is capable of conducting energy, in any form, from the first end of the link to the second end of the link. For example, electrical conducting material, e.g. copper wire, could be utilized for the link. In this alternative embodiment, the energy source would be an electrical power supply and the second end of the link could be fit with a resistor. The current supplied by the electrical power supply through the copper conductor to the resistor would heat the resistor to a sufficient temperature such that the resistor's location in proximity to a suitably configured optical transmission path would break the transmission path and thus the path would no longer be able to transmit a signal through the fiber optic assembly.

Optical transmission paths 230, 240, 250 and 260 in FIGS. 1 and 2, and 615, 625, and 635 in FIGS. 3 and 4, are composed of optical fibers and are rendered inoperable, i.e. incapable of transmitting a signal along the path, by breaking the fiber that constitutes the path. However, physically breaking the fiber paths is not required. For example, the optical fiber that constitutes the fiber paths could be physically changed by the energy transmitted to the paths by their respective links such that this physical change will no longer permit transmission of a signal over the fiber, e.g. by darkening the fiber or by changing the waveguiding properties of the fiber.

Whereas the disclosed embodiments show four and three optical transmission paths through a fiber optic assembly, any number of optical transmission paths in a particular fiber optic assembly can be configured by the present invention. A separate link would be provided for each optical transmission path in the fiber optic assembly.

The present invention can be utilized to configure fiber optic assemblies that are integrated into newly implemented fiber optic communication systems or to configure assemblies that are inserted into established communication systems where the configured assembly is a replacement assembly that is used to repair the communications system by replacing a damaged assembly in the system.

What is claimed is:

1. An apparatus for configuring a fiber optic assembly that is contained within a sealed enclosure, wherein the assembly includes a plurality of optical transmission paths and wherein each of the optical transmission paths is able to transmit a signal through the fiber optic assembly, comprising:

a plurality of links wherein each of said links is associated with one of said optical transmission paths and wherein each of said links extends through said sealed enclosure and has a first end located external to said sealed enclosure and a second end located within said sealed enclosure and adjacent to its associated optical transmission path; and an energy source coupled to a first end of one of said links wherein said energy source inserts energy into one of said links from said first end to said second end of one of said links and wherein the energy from said energy source renders the optical transmission path associated with said one of said links incapable of transmitting a signal through the optical transmission path.

2. The apparatus for configuring a fiber optic assembly of claim 1 wherein said sealed enclosure is hermetically sealed for utilization in an undersea fiber optic communications system.

3. The apparatus for configuring a fiber optic assembly of claim 1 wherein each of said links is an optical fiber and said energy source is a high powered laser.

4. The apparatus for configuring a fiber optic assembly of claim 3 further comprising an optical fiber splice box for coupling said high powered laser to said first end of each of said links.

5. The apparatus for configuring a fiber optic assembly of claim 3 wherein said second end of each of said links is fused to its associated optical transmission path.

6. The apparatus for configuring a fiber optic assembly of claim 1 further comprising:

a resistor inserted at said second end of each of said links and wherein each of said links is composed of an electrical conducting material and said energy source is an electrical power supply.

7. The apparatus for configuring a fiber optic assembly of claim 3 wherein said second end of each of said links includes a focusing device for increasing the optical power transferred to its associated optical transmission path.

8. The apparatus for configuring a fiber optic assembly of claim 3 wherein each of said optical transmission paths is coated with an optical power absorbing material.

9. An apparatus for configuring a fiber optic assembly that is contained within a sealed enclosure, wherein the assembly includes a plurality of optical transmission paths and wherein each of the optical transmission paths is able to transmit a signal through the fiber optic assembly and sealed enclosure, comprising:

means for rendering inoperable each of said optical transmission paths such that when said optical transmission path is inoperable said optical transmission path is no longer able to transmit a signal through said fiber optic assembly;

said means for rendering inoperable each of said optical transmission paths includes a link wherein said link has a first end located external to said sealed enclosure and a second end located within said sealed enclosure and adjacent to said optical transmission path and wherein said link is capable of transmitting energy from said first end to said second end; and means for inserting energy into said link at said first end.

10. The apparatus for configuring a fiber optic assembly of claim 9 wherein said sealed enclosure is hermetically sealed for utilization in an undersea fiber optic communications system.

11. The apparatus for configuring a fiber optic assembly of claim 9 wherein said link is an optical fiber and said means for inserting energy into said link is a high powered laser.

12. The apparatus for configuring a fiber optic assembly of claim 11 further comprising an optical fiber splice box for coupling said high powered laser to said first end of said link.

13. The apparatus for configuring a fiber optic assembly of claim 11 wherein said second end of said link is fused to said optical transmission path.

14. The apparatus for configuring a fiber optic assembly of claim 9 further comprising:

a resistor inserted at said second end of said link and wherein said link is composed of an electrical conducting material and said means for inserting energy into said link is an electrical power supply.

15. The apparatus for configuring a fiber optic assembly of claim 9 wherein said means for rendering inoperable each of said optical transmission paths breaks said optical transmission paths.

16. A method for configuring a fiber optic assembly that is contained within a sealed enclosure, wherein said assembly includes a plurality of optical transmission paths and wherein each of said optical transmission paths is able to transmit a signal through said fiber optic assembly, comprising the steps of:

providing each of said optical transmission paths with a link, said link extending through said sealed enclosure and having a first end located external to said sealed enclosure and a second end located within said sealed enclosure and adjacent to said optical transmission path;

coupling an energy source to said first end of said link;

transmitting an amount of energy from said energy source to said second end of said link; and transferring said energy from said second end of said link to said optical transmission path such that said optical transmission path is rendered incapable of transmitting a signal through said fiber optic assembly.

17. The method for configuring a fiber optic assembly of claim 16 further comprising the step of:

severing each of said links at a position between said first end and said sealed enclosure after transmitting energy from said energy source to said second end of said link.

18. The method for configuring a fiber optic assembly of claim 16 further comprising the step of:

focusing said energy transferred from said second end of said link to said optical transmission path.

19. The method for configuring a fiber optic assembly of claim 16 further comprising the step of:

coating each of said optical transmission paths with an optical power absorbing material.

20. A method for modifying a fiber optic communication system, the communication system including a fiber optic assembly that is contained within a sealed enclosure and wherein the fiber optic assembly has a specified configuration for transmitting signals input to the assembly to a destination, comprising the steps of:

removing the fiber optic assembly from the fiber optic communication system;

configuring a spare fiber optic assembly having a plurality of optical transmission paths and enclosed within a sealed enclosure to be configured as specified for the removed fiber optic assembly for transmitting selected signals input to the assembly to a destination;

said spare fiber optic assembly including a link for each of said optical transmission paths, said link extending through said sealed enclosure and having a first end located external to said sealed enclosure and a second end located within said sealed enclosure and adjacent to said optical transmission path; and installing said spare fiber optic assembly into the fiber optic communication system.

* * * * *